Nov. 22, 1955 C. C. CUTLER 2,724,740

QUANTIZED TRANSMISSION WITH VARIABLE QUANTA

Filed June 29, 1950 4 Sheets-Sheet 1

INVENTOR
C. C. CUTLER
BY Hugh S. Wertz
ATTORNEY

Nov. 22, 1955 C. C. CUTLER 2,724,740

QUANTIZED TRANSMISSION WITH VARIABLE QUANTA

Filed June 29, 1950 4 Sheets-Sheet 2

INVENTOR
C. C. CUTLER
BY Hugh S. Wertz
ATTORNEY

QUANTIZED TRANSMISSION WITH VARIABLE QUANTA

Filed June 29, 1950 4 Sheets-Sheet 3

INVENTOR
C. C. CUTLER
BY Hugh S. Wertz
ATTORNEY

INVENTOR
C. C. CUTLER
BY Hugh S. Wertz
ATTORNEY

United States Patent Office 2,724,740

Patented Nov. 22, 1955

2,724,740

QUANTIZED TRANSMISSION WITH VARIABLE QUANTA

Cassius C. Cutler, Gillette, N. J., assignor to Bell Telephone Laboratories, Incorporated, New York, N. Y., a corporation of New York

Application June 29, 1950, Serial No. 171,219

12 Claims. (Cl. 178—43.5)

This invention relates to the transmission of quantized signals and more particularly to methods and systems for the transmission of quantized signals with variable quanta.

In typical present-day communication systems in which a quantized signal is employed, it is customary to utilize a constant value of the signal quantum, i. e., to fix a specific number of quantum levels with which to approximate the signal sample amplitudes. Since, however, a communication signal is in general variable by nature, there are advantages to be derived from varying the quantum value according to the immediate character of the signal. For example, in the situation where the original signal is of low amplitude it can be more accurately measured (that is, more closely approximated) with small quantum values. On the other hand, large quanta are sufficient to describe a signal of large amplitude. Thus, a system which accommodates the size of the quantum to the condition of the signal, offers manifest possibilities of considerable savings in channel capacity.

It is the principal object of the present invention to improve the efficiency of quantized signal communication systems by varying the quantization therein to accord with the immediate signal requirements.

It is in accordance with the invention, although not necessary thereto, to combine the variable quantization of the present invention with the differential quantization techniques discussed in my copending application, Serial No. 171,218 filed June 29, 1950, issued July 29, 1952, as Patent No. 2,605,361. In differential quantization, the efficiency of transmission of quantized signals is enhanced by transmitting the changes of quantum levels of successive quantized signals rather than the levels themselves. At the receiver, each of the received differences is then added to the corresponding preceding level so as to synthesize the original signal. It will be convenient to use the term "differential," which, in a gross sense, will refer to the ratio of difference in quantum levels to the time between adjacent samples. If differential quantization of this kind is used in conjunction with the present invention, in the situation where the original signal is slowly varying, the change of signal level between consecutive sampling intervals is small and therefore can be more accurately measured with small quantum values. On the other hand, large quanta will suffice to describe a rapidly varying signal. In this preferred embodiment, which combines the advantages of both differential and variable quantization, the input signal traverses a subtractor, passes through a level control circuit and then into a sampling quantizer. The stepped output wave from the quantizer passes through a second level control circuit whose effect on the amplitude is equal and opposite to that of the first level control circuit. At this point the signal path divides, with one branch going to an integrator and then back to the original subtracting circuit. In the other branch the signal is delayed so as to actuate the level control circuits during the succeeding period. The output, to a coder and transmission circuit, is obtained from the quantizer. At the receiver the signal is passed through another level control circuit, which is similarly controlled from its own output, and thence to an integrator which reproduces a replica of the original signal.

It is, of course, in accordance with the invention to apply variable quantization to systems using straight quantization as well as to those employing differential quantization, and similarly the invention is equally applicable to the multiple differential quantization techniques which are also disclosed in the above-identified copending application.

The invention will be more fully understood from the following detailed description of certain illustrative embodiments thereof, taken in connection with the appended drawings forming a part thereof, in which:

Fig. 1 illustrates a simple preferred embodiment of the variable quantization transmission system which is in accordance with the invention;

Figs. 2A thru 2F shows certain sample wave forms at various points in the system of Fig. 1;

Figures 1, 3, 4:
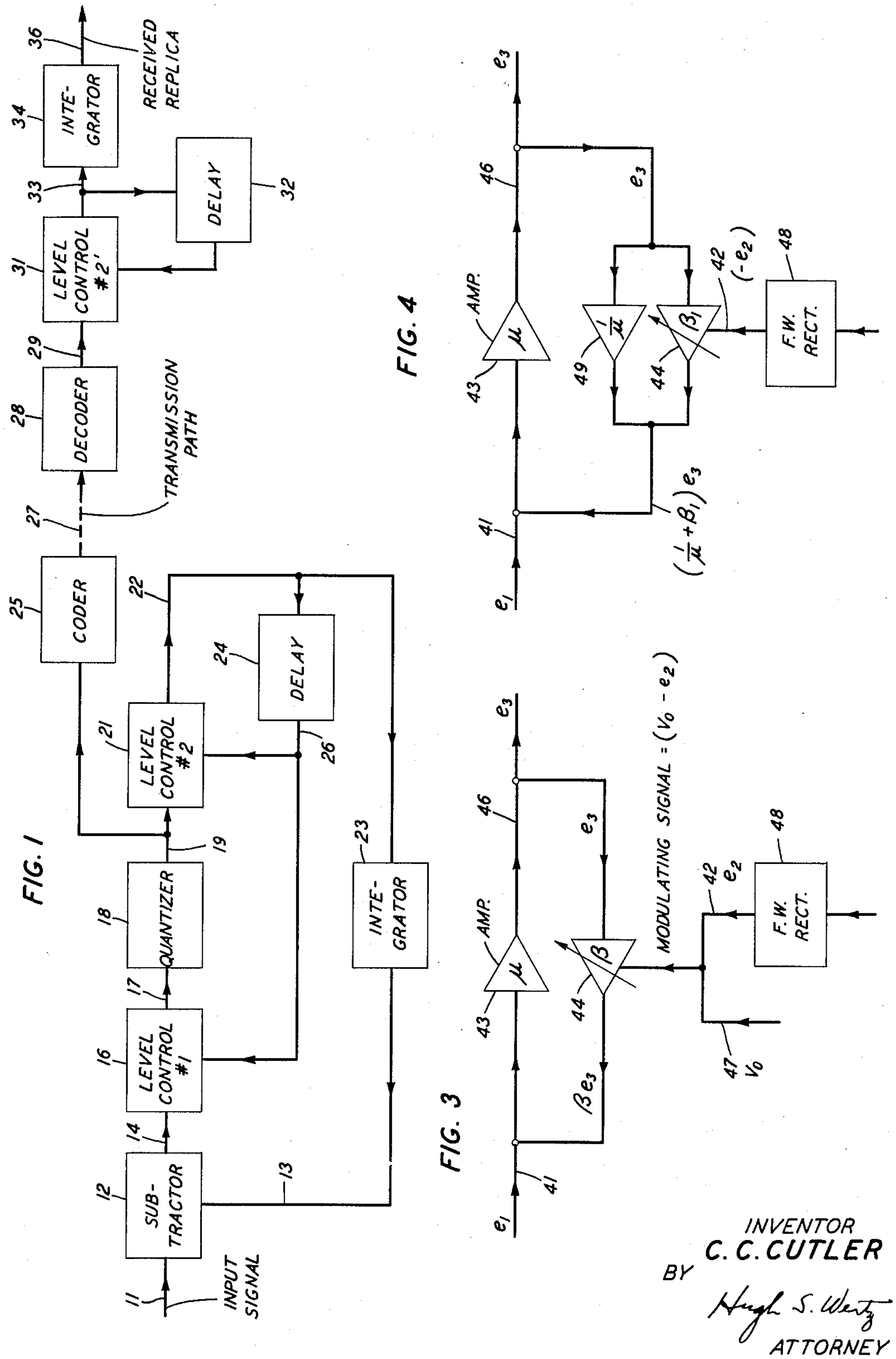
Fig. 3 shows in block schematic an exemplary arrangement of a level control circuit which can be employed in the practice of the invention.
Fig. 4 shows also in block schematic another exemplary arrangement of a level control circuit which can be used in the practice of the invention.

The arrangement which is shown in Fig. 1 illustrates the application of the invention to the differential quantization scheme which is discussed in detail in my aforementioned copending application. It is obvious that the present invention is equally applicable to straight quantization transmission systems, but since the principal advantages of the invention are manifest when it is used in conjunction with differential quantization, the preferred example of practice which is shown in Fig. 1 is considered to be that most suited to a concise explanation of the present invention. In the system shown in Fig. 1, an input signal 11, which may be speech, music, television, etc., is fed to subtractor 12, where another signal 13 is subtracted from it. To facilitate the exposition of the operation of the invention, let it be assumed that the original input signal 11 has successive amplitudes *a*, *b*, *c*, *d*, and *e*, and that the output 14 of the subtractor has corresponding amplitudes *u*, *v*, *w*, *x*, and *y* at the corersponding times. This subtractor circuit 12 can in accordance with the invention be any of the many circuits which are well known in the art for performing a subtractive function (i. e., for taking the difference in amplitude between two signals) and can, for example, be simply a resistance network. In Fig. 2, wave form A illustrates an example of a typical original input signal, and wave form B illustrates a typical subtractor output for such an input signal.

The difference signal 14 is fed to a level control circuit 16, where it is operated upon to produce a signal 17 having corresponding amplitudes $(pu)$, $(qv)$, $(rw)$, $(sx)$, and $(ty)$. The significance of these values $p$, $q$, $r$, $s$, and $t$ will be apparent when the remainder of the system has been described. The nature of the operation of the level control circuit 16 will also become apparent at a later point in the description of the system. This level control output signal 17 is operated upon by a sampler and quantizer 18, such as is well known in the pulse code modulation art, thereby yielding a quantized signal 19 having successive amplitudes $(pu)'$, $(qv)'$, $(rw)'$, $(sx)'$ and $(ty)'$. These signals 19 are then applied to a second level control circuit 21 whose operation is reciprocal to that of level control circuit 16, so that the output signal 22 from this level control circuit has amplitudes at the corresponding times of $u'$, $v'$, $w'$, $x'$, and $y'$. In Fig. 2, level control output signal 17, quantizer output signal 19, and level control output signal 22 are illustrated as wave forms C, D, and E respectively. A portion of the signal 22 is applied to an integrator 23 and the resultant signal 13 is, as described above, then subtracted from the input signal 11 so as to yield a differential signal, just as in the differential quantization system of the copending application. The embodiment of the present invention which is illustrated in Fig. 1, however, also provides for delaying a portion of the signal 22 in delaying means 24 by an amount equal to, in this example of practice, one sampling period. It is the delayed signal 26 which is used to actuate the level control circuits 16 and 21. Level control circuit 16 is operated on such that $$q\,|u'|=r\,|v'|=s\,|w'|=t\,|x'|,\ \text{etc.}=n$$

That is, the factors $p$, $q$, $r$, $s$, and $t$, by which signal 14 is multiplied in level control circuit 16, are inversely related to the absolute value of the previous quantized sample. It is obvious that to cover quiescent periods there must be a minimum value of $p$, $q$, $r$, $s$, and $t$, which can conveniently be designated as the value $m$. That is, $$p,\ q,\ r,\ s,\ \text{and}\ t\geqq m$$

In Fig. 2, in order to achieve the utmost simplicity, both $m$ and $n$ have been set equal to unity (i. e., $m=n=1$).

It is at once apparent that the successive amplitudes of the signal 19 can be represented as $$(mu'),\ \left(\frac{n}{|u'|}v'\right),\ \left(\frac{n}{|v'|}w'\right),\ \left(\frac{n}{|w'|}x'\right),\ \left(\frac{n}{|x'|}y'\right)$$

In the simple case which is illustrated in Fig. 2, in which $m=n=1$, these amplitudes 19 become:

$$u',\ \frac{v'}{|u'|},\ \frac{w'}{|v'|},\ \frac{x'}{|w'|},\ \frac{y'}{|x'|}$$

Thus, each quantized sample is divided by a factor proportional to the previous sample or by a certain constant factor, in this case unity. Since these previous samples represent differentials of the original input signal 11, it is evident that the effect of this type of quantization is that a signal which is varying slowly as compared to the sampling period is very well defined (i. e., its quanta are small), whereas a signal which varies rapidly is not as well defined. A rapidly varying signal requires larger quantum values rather than more levels to transmit it.

Alternatively, if the amplitude of the differential signal 14 is taken as the signal of interest, the quantum value is seen to be a function of the signal amplitude, yielding small quantum values for low amplitudes thereof and large quantum values for large signal amplitudes.

Figure 2A:
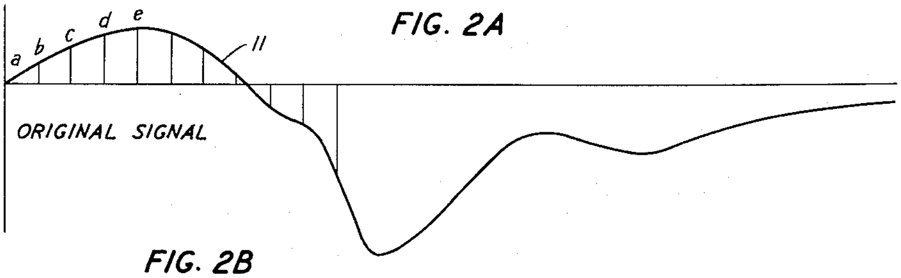
Figure 2B:
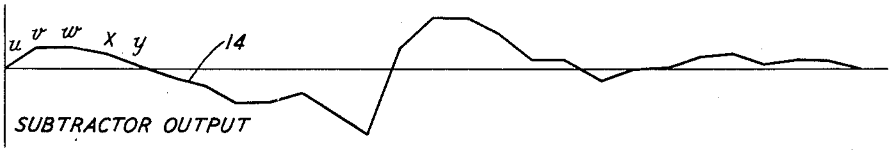
Figure 2C:
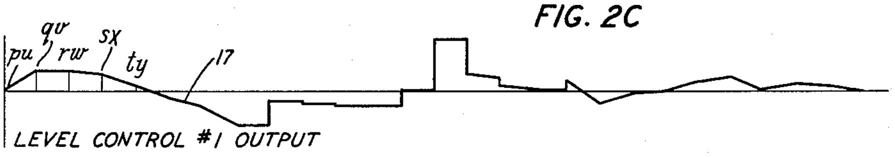
Figure 2D:
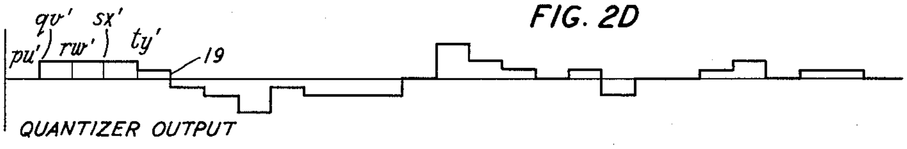
Figure 2E:
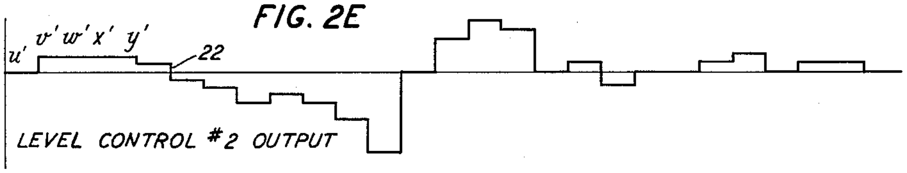
Figure 2F:
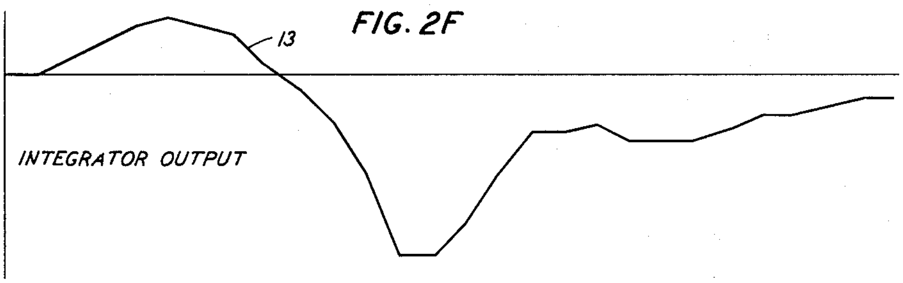

The action in the level control circuit 21 is, as has been mentioned above, reciprocal to that in level control circuit 16, in order that the output signal 22 of level control circuit 21 can approximate a quantized version of the differential signal 14 from the subtractor 12. As was also stated above, this signal 22 is fed to an integrator 23, whose output 13 has succeeding amplitudes $u'$, $u'+v'$, $u'+v'+w'$, $u'+v'+w'+x'$, $u'+v'+w'+x'+y'$, etc. This signal 13, illustrated in Fig. 2F, is the signal which is subtracted (in subtractor 12) from the original input signal 11 having the amplitudes $a$, $b$, $c$, $d$, $e$, etc., as chosen above. The subtractor yields signal 14 comprising amplitudes $u$, $v$, $w$, $x$, $y$, etc., so that the following relationships are manifest:

$$a-0=u,$$
$$b-u'=v,$$
$$c-(u'+v')=w,$$
$$d-(u'+v'+w')=x,$$
$$e-(u'+v'+w'+x')=y,\ \text{etc.}$$

It follows readily that:

$$u\cong a\cong u',$$
$$v\cong b-a\cong v'$$
$$w\cong c-b\cong w'$$
$$x\cong d-c\cong x',$$
$$y\cong e-d\cong y',\ \text{etc.}$$

(It has, for convenience of illustration, been assumed that the signal 14 is of zero amplitude at all times prior to that corresponding to $u$.) It is quite clear therefore that regardless of how the level control circuits 16 and 21 act, providing that they have equal and opposite effects, the last recited relationships are valid and the signal 14 is a differential signal. In accordance with the embodiment of the invention now being discussed in connection with Fig. 1, the output signal 19 which is prepared for transmission to the receiving point is such a differential signal (which has also been variably quantized), but it is equally within the ambit of the invention for this signal to be a double, triple, or other multiple differential signal, which can be formed in accordance with the invention described in my copending application, or even a straight quantized signal. Since, however, a differential signal is utilized in the practice of this invention to control the variable quantization, it is desirable to transmit this differential signal and thereby to gain all the advantages which differentiation affords.

Briefly summarized, it can be said that the level control circuit 16 acts to multiply each message sample by a factor which is inversely related to the absolute value of the immediately preceding quantized sample. Then this variable multiplied signal 17 is quantized in turn. Additionally, the quantized signal 19 is acted on by the level control circuit 21 which multiplies by a factor which is the reciprocal of the multiplying factor used by the level control circuit 16 and, after delay by the delay means 24, is then supplied to the level control circuits 16 and 21 to control the multiplication of the immediately succeeding sample. In the preferred embodiment which has been described, the message samples on which the level control circuits act are not the original message samples but are instead differential signals derived therefrom.

It is also in accordance with the invention, although not necessary thereto, to code the output signal 19 in a coding device 25, of any of the types which are well known in the pulse code modulation art, and to transmit the resultant coded signal 27 to a receiving station. At the receiving station, the signal is decoded in a decoder device 28, which can also be any of the several types which are well known in the art, and the decoded signal 29 is then operated on by a level control circuit 31 and a delaying means 32 which operate in exactly the same manner as the level control circuit 21 and the delaying means 24 in the transmitter. This results in a signal 33 which is no longer variably quantized but which is nevertheless still a differential signal. It is therefore operated on by integrator 34 in order to yield a signal 36 which is a replica of the original input signal 11. It is apparent that signal 29 in the receiver is the equivalent of signal 19 in the transmitter (shown in Fig. 2D). Similarly, signal 33 in the transmitter is the equivalent of signal 22 in the transmitter (Fig. 2E).

Except for the level control circuits 16, 21, and 31, all of the elements which are called for in the practice of the invention are old and well known in the art, despite the novelty of their combination in this manner. As far as these level control circuits are concerned, it is apparent that they are really nothing more than gain-controlled amplifiers, the gain being a function of a variable signal other than the signal which is being amplified. Although such amplifiers are not novel, a sample of one which will operate in accordance with the invention is shown in Fig. 3. It is evident that the desired operation of the circuit of Fig. 3 is to divide a signal 41 (herein designated "$e_1$"), which represents symbolically any of the respective input signals (such as 14 and 19, for example, in the transmitter of Fig. 1) supplied to the several gain-controlled amplifiers or level control circuits, by another signal 42 (herein designated "$e_2$"), which represents symbolically any of the respective gain control input signals (the absolute value of signal 26, for example) also supplied to the several gain-controlled amplifiers.

If it is assumed that the amplifier characteristic $\mu$ of the variable gain control amplifier 43 has substantially zero phase and constant amplitude over the range of frequency in interest, then, within that frequency band, $\mu$ is simply a real number. It can further be assumed that the multiplier circuit 44 is characterized by a gain relative to the signal 46 (the output of amplifier 43, herein designated "$e_3$") which is given by $$\beta=k(V_0-e_2)$$

where $k$ is a constant of the multiplier circuit and $V_0$ is a properly chosen bias 47. A ring-type modulator, such as is well known in the electronic art, can, for example, be made to work in approximately such fashion. It is then readily demonstratable that $$e_3=\frac{e_1}{\frac{1}{\mu}-kV_0+ke_2}$$

In accordance with the invention, the bias $V_0$ can be made equal to $$\frac{1}{\mu k}$$

so that $e_3$ is simply $$\frac{e_1}{ke_2}$$

which is the desired relation for the divider circuit, since $e_2$ is the signal by which the respective levels in circuits 16 and 21 (in the transmitter of Fig. 1) are controlled. This voltage $e_2$, the gain-control input, can be made to represent the absolute value of the preceding differential amplitude, as is called for by the arrangement of Fig. 1, simply by providing a full wave rectifier 48 which operates on delayed signal 26 and yields the signal 42 ($e_2$) which represents the absolute value.

It is to be noted that, in the example of practice just described, the loop gain is $$\mu\beta=1-\mu ke_2$$

so that when $e_2=0$ there is unity positive feedback and the amplifier 43 imparts infinite gain to a signal 41 ($e_1$). And, when $\mu ke_2$ becomes negative, $\mu\beta$ is positive and larger than unity. As an isolated system, the circuit would be unstable under this condition and would tend to "run away." When, however, the circuit is an interconnected part of an over-all network which forces the circuit to "behave," as is the case in the practice of the invention, then the above-described arrangement can safely be used for any values of $\mu ke_2$.

Figure 5A:
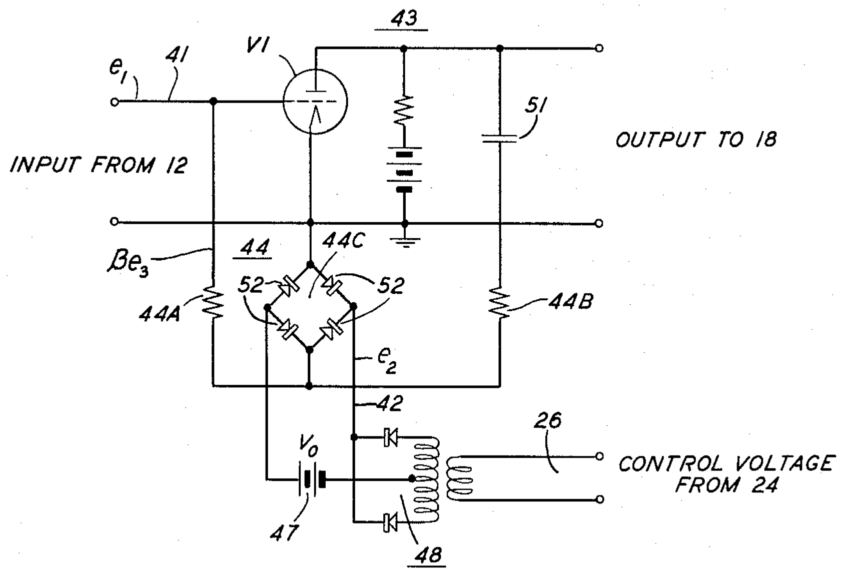
Figs. 5A and 5B show in circuit schematic form typical level control circuits of the kind shown in block schematic in Fig. 3 for use in the system shown in Fig. 1.

Fig. 5A shows diagrammatically, by way of example, a level control circuit, of the kind shown in block form as Fig. 3, which can be used as the level control circuit No. 1 (block 16) in the system shown in Fig. 1. It comprises the amplifying element, or vacuum tube V1, having a cathode, anode and control grid. To the control grid-cathode circuit there is supplied from the subtractor 12 (Fig. 1) by way of conductor 41, the signal 14, or $e_1$, whose amplitude is to be divided by a factor proportional to the gain control signal 26, or $e_2$, to provide an output $e_3$ proportional to $$\frac{e_1}{e_2}$$

as described above. The amplifier V1 is provided with a feedback path between the anode and control grid and the amount of feedback $\beta e_3$ is controlled by the amplitude $e_2$. To this end, the feedback circuit 44 includes the T-bridge comprising the two series resistive arms 44A and 44B and the shunt arm 44C which includes a balanced bridge made up of non-linear elements 52, which for example, can be crystal rectifiers. As is well known, the impedance measured across one pair of diagonally opposite terminals of such a balanced bridge is determined by the voltage applied across the other diagonally opposite pair of terminals. In this case, the voltage applied across one pair of terminals is the difference of the voltage $V_0$, chosen as described earlier, and the control signal $e_2$, derived from the full wave rectifier 48 which operates on the signal 26 supplied from the delay element 24 to yield a signal which represents its absolute value. In operation, the amplitude of signal $e_2$ controls the T-bridge which in turn controls the amount of feedback, so that as the value of $e_2$ increases, the feedback increases, and the gain of tube V1 is reduced proportionally. Accordingly, for an input signal $e_1$, and a control signal $e_2$, there will result an output proportional to $$\frac{e_1}{e_2}$$

for use by the quantizer 18 (Fig. 1). A circuit of this sort is shown incorporated in the arrangement illustrated in Fig. 6.

It should similarly be evident that the T-bridge, described above, can be used alone to provide a variable gain circuit of the kind needed for use as the level control circuits No. 2 and No. 2′ (blocks 21 and 31 in Fig. 1), which perform the reciprocal of the function performed by the variable gain amplifier just described. In this case, input signals as, for example, from the quantizer 19 (Fig. 1) are applied across one pair of terminals of a T-bridge 54 comprising the series arms 54A and 54B and the shunt arm 54C, and output signals 22 (Fig. 1) are derived across the other pair of terminals. As in the previously described circuit arrangement, the shunt arm 54C comprises a balanced bridge of non-linear elements 62, and its impedance is controlled by the difference of voltage $V_0$ and the control voltage $e_2$ derived from the full wave rectifier 58 which operates on signal 26 supplied by way of delay element 24.

In operation, the transmission through the T-bridge 54 is controlled by the value of $e_2$ so that as $e_2$ increases the output available to the integrator 23 and the delay element 24 (Fig. 1) increases substantially proportionately. As a result there is made available a variable gain circuit of a kind suitable for the practice of the invention. Circuits of this kind are shown in Fig. 6 incorporated into the system of Fig. 1 in place of the level control circuits No. 2 and No. 2′.

Figure 5B:
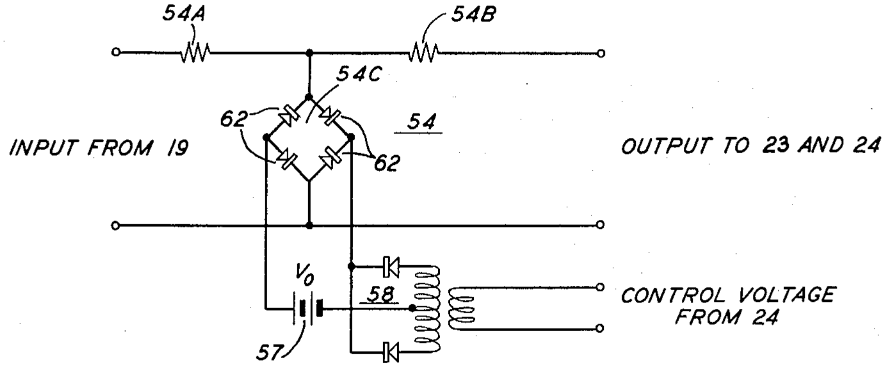
Figure 6:
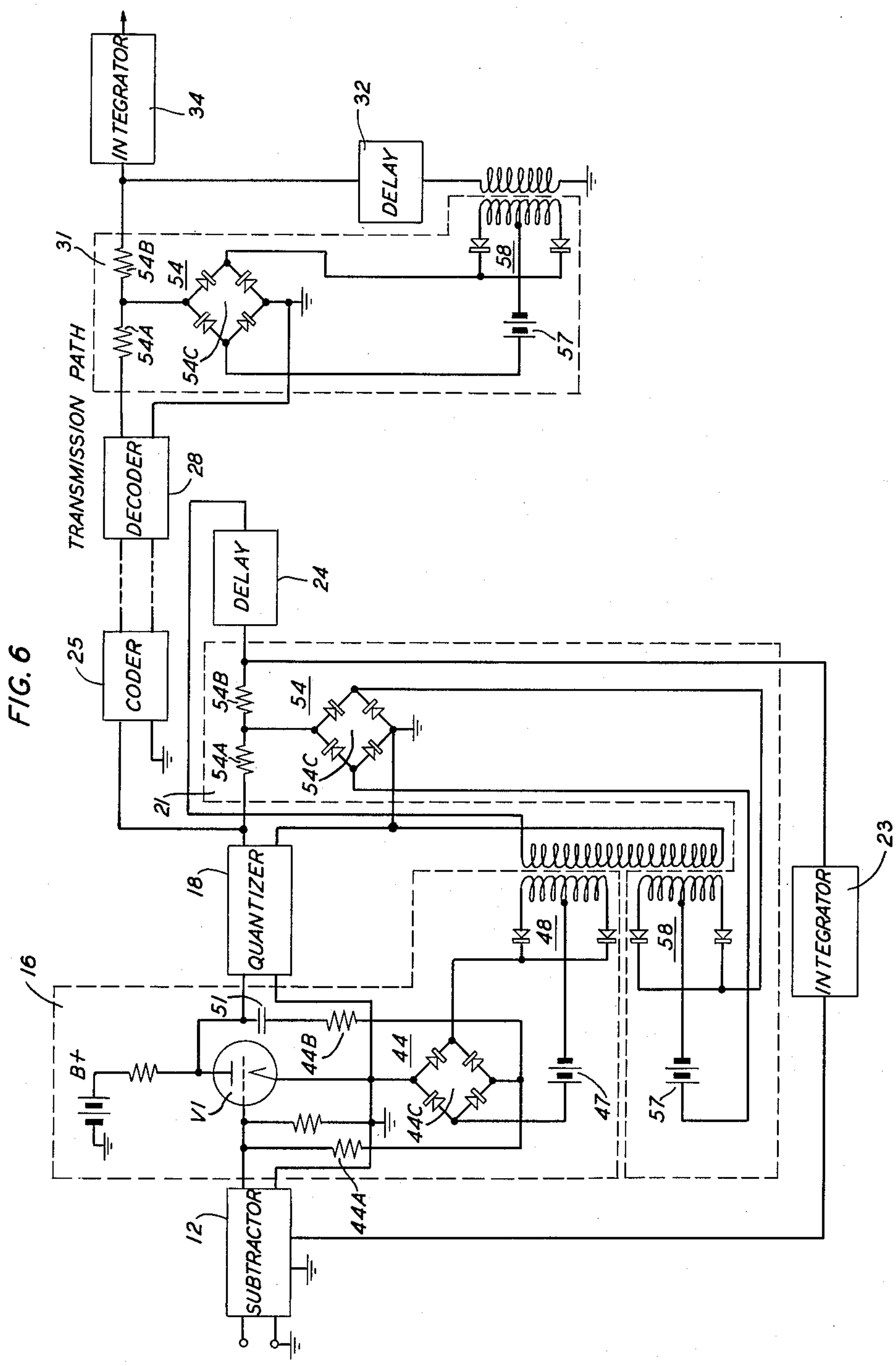
Fig. 6 shows partly in block form and partly diagrammatically the system of Fig. 1.

In Fig. 6 there is shown the system of Fig. 1 in which the blocks labelled level control circuits Nos. 1, 2, and 2′ have been replaced by corresponding circuits of the kind shown in Figs. 5A and 5B. The operation is as described with reference to Fig. 1.

An alternative arrangement which can be used to provide the reciprocal gain controls in accordance with the invention is shown in Fig. 4. This circuit is similar to that of Fig. 3, except that the bias signal 47 ($V_0$) of that figure is eliminated and shunt transmission network 49, having a transmission characteristic $$\frac{1}{\mu}$$

is added to the multiplier circuit 44 (now designated $\beta_1$). It can readily be shown that this produces the desired over-all relation, as before. This circuit is somewhat more simple to construct in practice than the one of Fig.

3, since it is not a requirement of this alternative arrangement to have the transmission characteristic $\mu$ phaseless and constant over the frequency band. It is sufficient merely to approximate the reciprocal of $\mu$ in the added transmission network 49 around the multiplier 44.

Returning now to a consideration of the variable quantization system itself, it is evident that an error in the signal transmission is carried over to succeeding samples. This error has the effect of causing a change in the amplitudes of the reproduced signals which persists until the next quiescent period, i. e., until the lower limit of the level control multiplier $m$ is reached in both transmitter and receiver. Thus, except for a temporary and not severe derangement of the system, operation is normal despite an error in signal transmission.

It is to be understood that the above-described arrangements are illustrative of the application of the principles of the invention. Numerous other arrangements may be devised by those skilled in the art without departing from the spirit and scope of the invention.

What is claimed is:

1. In a communication system, means supplying a succession of message samples, a level control circuit for multiplying each message sample by a factor which is inversely related to substantially the absolute value of the immediately preceding sample and for providing thereby variable multiplied samples, means for quantizing said multiplied samples and deriving variable quantized samples, and means for utilizing said variable quantized samples.

2. In a communication system, means for sampling a message wave and deriving message samples, means supplied with said message samples for deriving differential samples which are related to the time rate of change of said message wave, means for multiplying each of said differential samples by a factor which is inversely related to substantially the absolute value of the immediately preceding differential sample and providing variable differential samples, means for quantizing said variable differential samples and providing variable quantized differential samples, and means for utilizing said variable quantized differential signals.

3. In a closed loop to which input message samples are applied to the input terminals and from which variable quantized message samples are derived for utilization purposes from the output terminals, a first level control means supplied with input samples for multiplying each sample by a factor which is inversely related to substantially the absolute value of the immediately preceding sample and for deriving thereby variable multiplied samples, means for quantizing said multiplied samples and providing variable quantized samples to the output terminals, a second level control means also supplied with said variable quantized samples for multiplying each variable quantized sample by a factor which is related to the absolute value of the preceding sample and for deriving thereby variable multiplied samples, means for delaying said last-mentioned multiplied samples by a sampling interval and deriving delayed samples, and means for supplying said delayed samples to the first and second level control means.

4. In a communication system, a closed loop according to claim 3 for providing variable quantized signals, means for transmitting said variable quantized signals to a receiving station, and means at said receiving station to construct from said transmitted signals a replica of the original message wave.

5. In combination, means supplied with an input message wave for forming differential signals which are a measure of the time-rate of change of said message wave, and a closed loop according to claim 3 to whose input terminals are applied as input message samples said differential signals and from whose output terminals are derived variable quantized differential samples.

6. In a communication system, means for periodically sampling a message wave and deriving thereby message samples, a variable gain amplifier having an input element and a gain control element, means for applying simultaneously to the input element and the gain control element, respectively, an instant sample and a measure of the absolute value of the sample immediately preceding the instant sample for deriving variable multiplied samples, means for quantizing said variable multiplied samples and deriving variable quantized samples, and means for utilizing said variable quantized samples.

7. In a communication system, means for periodically sampling a message wave and deriving message samples, means supplied with said message samples for deriving differential samples which are related to the time-rate of change of said message samples, a variable gain amplifier having an input element and a gain control element, means for applying simultaneously to the input element and gain control element, respectively, an instant differential sample and a measure of the absolute value of the differential sample immediately preceding the instant differential sample for deriving variable multiplied differential samples, and means for quantizing said variable multiplied differential samples and deriving variable quantized differential samples, and means for utilizing said variable quantized differential samples.

8. In a closed loop to which input message samples are applied to the input terminals and from which variable quantized message samples are derived for utilization purposes from the output terminals, a first variable gain amplifier having an input element and a gain control element, means for applying simultaneously to the input element and the gain control element, respectively, an instant input message sample and a measure of the reciprocal of the absolute value of the input message sample immediately preceding the instant input message sample for deriving first variable control samples, means for quantizing said first variable controlled samples and supplying variable quantized signals to the output terminals, a second variable gain amplifier having an input element and a gain control element, means for applying simultaneously to the input element and the gain control element, respectively, an instant first variable control quantized sample and a measure of the absolute value of the first variable controlled quantized sample immediately preceding the instant first variable controlled quantized sample for deriving second variable controlled samples, means for delaying said second variable controlled samples by a sampling interval, and means for supplying said delayed samples to the first and second variable gain amplifiers for controlling their gain.

9. In a communications system, a closed loop according to claim 8 for providing variable quantized signals, means for transmitting said variable quantized signals to a receiving station, and means at said receiving station to construct from said transmitted signals a replica of the original message wave.

10. In combination, means supplied with an input message wave for forming differential signals which are related to the time-rate of change of said message wave, and a closed loop according to claim 8 to whose input terminals are applied as input message samples said differential signals and from whose output terminals are derived variable quantized differential signals.

11. The method of transmission which comprises the steps of sampling a message wave to be transmitted for deriving message samples, continuously varying the amplitude of each particular sample substantially in inverse relation to the amplitude of its immediately preceding sample, and continuously transmitting the samples of varied amplitude to a receiving point.

12. The method of transmission which comprises the steps of sampling a message wave for deriving message samples, continuously varying the amplitude of each particular sample substantially in inverse relation to the amplitude of its immediately preceding sample for deriving level controlled samples, quantizing said level controlled samples, and transmitting said quantized samples to a receiving point for utilization in the reconstruction of a replica of the message wave.

References Cited in the file of this patent

UNITED STATES PATENTS 2,510,054 Alexander et al. ---------- June 6, 1950

2,531,846 Goodall -------------- Nov. 28, 1950

OTHER REFERENCES

"Telephony by Pulse Code Modulation," Goodall; Bell System Technical Journal, vol. XXVI, July, 1947, page 401.

Radiocraft, February 1948, pp. 28–30, 47.